United States Patent [19]

Meissner et al.

[11] 4,216,584
[45] Aug. 12, 1980

[54] DIGITIZED DISTANCE MEASURING DEVICE

[76] Inventors: J. Michael Meissner, 42 S. Quincy, Hinsdale, Ill. 60521; Norman F. Fyler, 970 North Ave., Deerfield, Ill. 60015

[21] Appl. No.: 944,199

[22] Filed: Sep. 19, 1978

[51] Int. Cl.³ ............................................. G01B 7/02
[52] U.S. Cl. .............................. 33/143 L; 33/147 N; 33/27 C; 33/158
[58] Field of Search .................. 33/143 L, 27 R, 27 C, 33/147 N, 148 H, 147 T, 147 J, 149 J, 143 M, 158, 160, 143 R

[56] References Cited

U.S. PATENT DOCUMENTS

| | | | |
|---|---|---|---|
| 1,404,794 | 1/1922 | Reitenbaugh | 33/27 C |
| 2,886,892 | 5/1959 | Banfill | 33/148 |
| 3,276,131 | 10/1966 | Hahn | 33/147 N |
| 4,037,325 | 7/1977 | Weber et al. | 33/125 C |
| 4,063,362 | 12/1977 | Amsbury | 33/147 J |

FOREIGN PATENT DOCUMENTS 2710312  9/1978  Fed. Rep. of Germany ........ 33/143 L

*Primary Examiner*—Willis Little
*Attorney, Agent, or Firm*—Cushman, Darby & Cushman

[57] ABSTRACT

The present invention relates to a distance measuring device which may be utilized as a caliper/scale to measure or mark distances without the use of an incremented linear object. A resistive strip is attached along a beam. Two reference devices are also attached to the beam, one of the reference devices being slidably attached. The resistance of the resistive strip between the reference devices is related to the distance between the reference devices. This distance is displayed on a digital readout attached to the distance measuring device. Means are provided for displaying the distance in any one of a number of units, and for scaling the distance. In the preferred embodiment, the beam is glass and the readout device is embedded in the glass.

28 Claims, 5 Drawing Figures

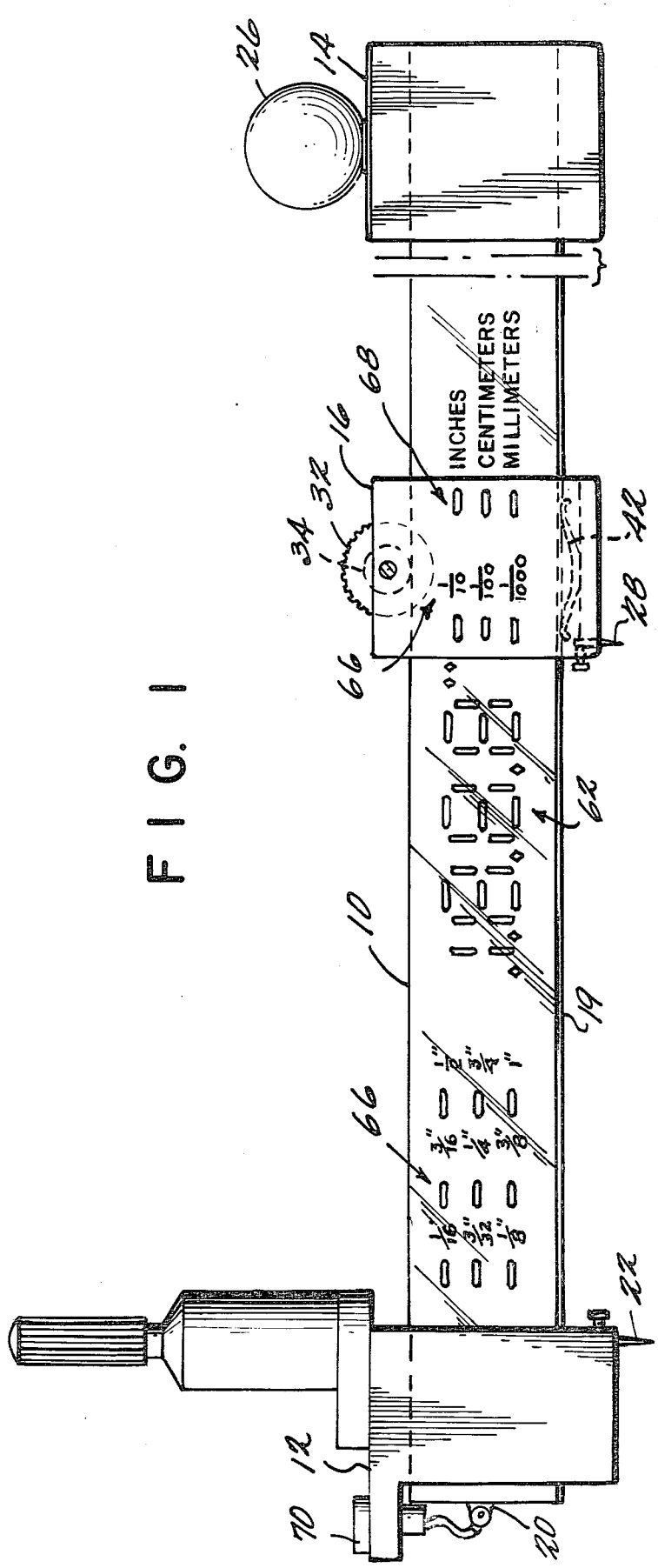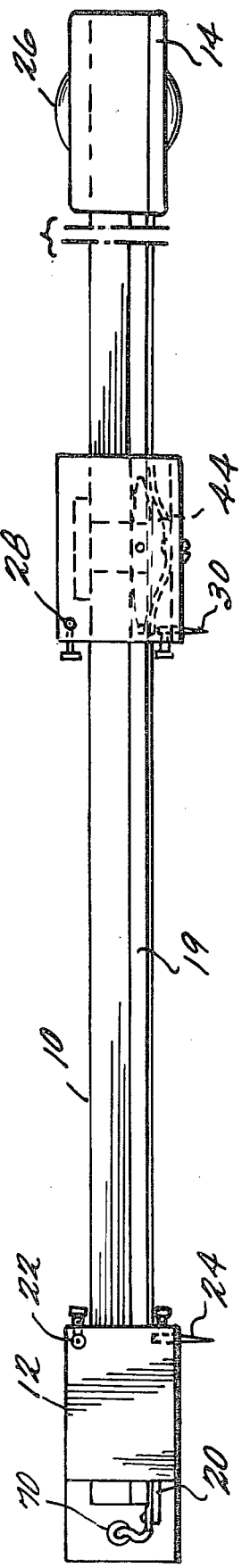

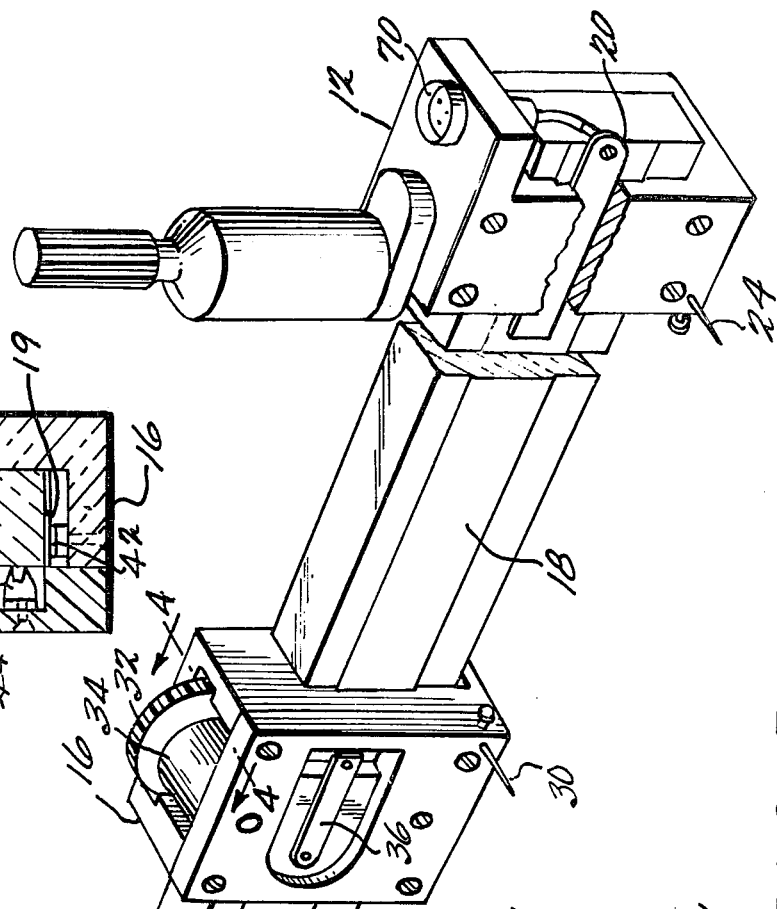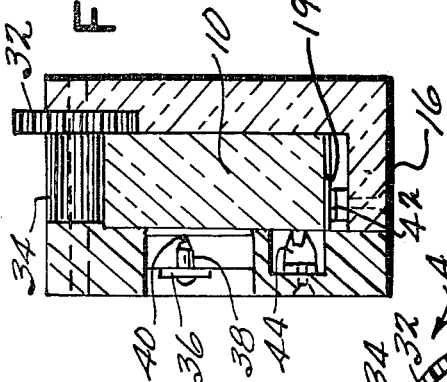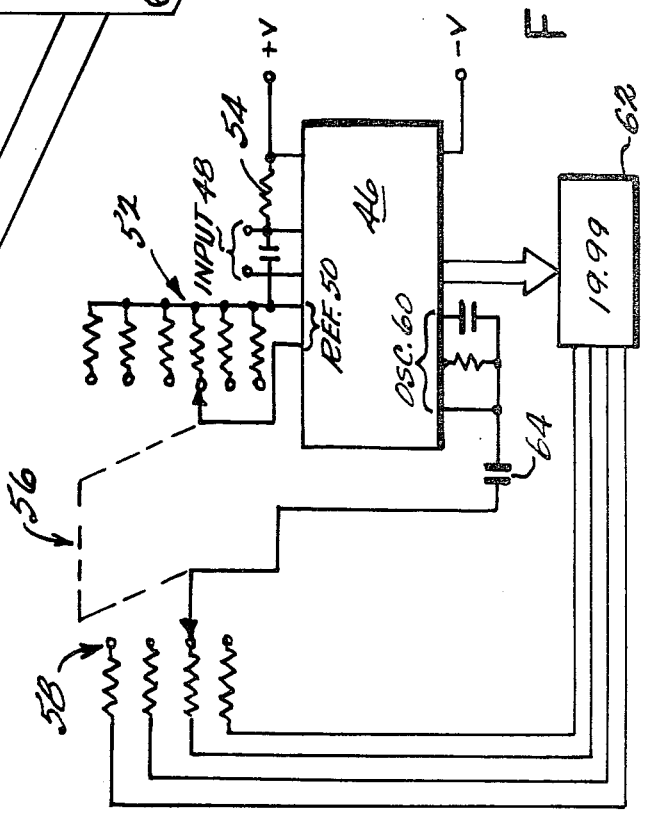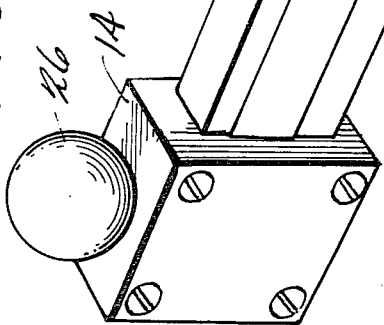

DIGITIZED DISTANCE MEASURING DEVICE

BACKGROUND AND SUMMARY OF THE INVENTION

The present invention relates to a distance measuring device, and more particularly, to a digitized caliper device which eliminates the need for an incremented linear object to measure or mark distances.

U.S. Pat. No. 2,886,892 to Banfill, discloses a related device. A curved resistive element is attached to the pivotable arms of a caliper-type device so that the resistance of the portion of the resistive element between the arms is related to the angular spread thereof. A signal related to the resistance is directed to an external processing unit which displays the distance between the points of the caliper arms.

However, an inherent inaccuracy exists with the pivotable arm-type device described above. Assuming the resistance per unit length of the resistive element is constant, the resistance measured is proportional to the angular spread of the caliper arms. However, the distance between the tips of the arms is proportional to the sine of one-half the angle between the arms. Thus, the distance between the tips of the arms is not proportional to the angular spread of the arms or the resistance measurement related thereto. For example, when the angle between the caliper arms increases by a factor of 6 from 15 degrees to 90 degrees, the distance between the tips increases by a factor of 5.42. Since an increase by a factor of 6 in the angle between the arms does not produce an equivalent factor of increase in the distance between the tips, an inherent error results.

Thus, either this inherent error must be tolerated, or a resistive element whose resistance per unit length varies with the sine of one-half the angle between the caliper arms must be utilized. Although sinusoidal potentiometers are known in the art, they are expensive. The expense in this particular instance would be particularly significant since the potentiometers would have to be custom made for the calipers.

Furthermore, Banfill teaches the use of an external housing for the display, calibration and scaling circuitry—a distinct disadvantage in such a device. When attempting to scribe a circle or simply transfer a measurement, the cord connecting the mechanical component to the electrical component would certainly interfere with the ease of operation of the device. Furthermore, the cord, and particularly its connection to the mechanical and electrical portions, may be subjected to damaging stress.

In addition, Banfill teaches an analog display. This increases the amount of time necessary to read the device, and also makes the reading process less accurate. As a result of the increased concentration and time necessary to read an analog scale, the user of the device is more likely to experience eye strain and fatigue.

The present invention overcomes the problems inherent in the prior art. In the present invention, two reference devices are attached to a common beam, one being ridigly attached and the other being slidably attached. The beam also includes a resistive strip along one of its faces, which strip is electrically contacted by pickups attached to the slidable and fixed reference devices. The resistance between the pickups is directly proportional to the distance therebetween. The resistance is detected and displayed in digital form using circuitry which may be attached to the distance measuring device. In fact, in a preferred embodiment, the beam is glass and at least the digital display is embedded within the glass. Means are also provided for displaying the distance between the reference devices in any one of a plurality of units or in scaled form.

Thus, since the movement of the variable reference device with respect to the fixed reference device is linear, as is the resistane per unit distance of the strip, the inherent inaccuracy of a caliper device with pivotable arms is eliminated. Since the device need not be connected to an external unit, utilization of the device requires a minimum effort. The digital display further reduces the fatigue inherent in using such a device for extended periods of time.

This and other objects and advantages of the invention will become more apparent and more readily appreciated from the following detailed description of the presently preferred exemplary embodiment of the invention taken in conjunction with the accompanying drawings, of which:

FIG. 1 is a front elevational view of the preferred embodiment of the present invention;

FIG. 2 is a top-rear perspective view of the preferred embodiment of the present invention;

FIG. 3 is a bottom plan view of the preferred embodiment of the present invention;

FIG. 4 is a sectional view taken along the IV—IV line of FIG. 2; and

FIG. 5 is the circuit diagram of the presently preferred embodiment of the present invention.

As is illustrated in FIGS. 1 through 3 of the drawing, the presently preferred embodiment of the present invention is comprised of four basic units. Fixed reference means such as pivot block 12 and swing knob 14 are rigidly attached to rheostat beam 10. Variable reference means such as carriage block 16 is slidably attached to rheostat beam 10.

Beam 10 may be made of any material, but in the preferred embodiment is glass. Glass was selected because of its dimensional stability with respect to temperature and its transparency. The glass may be ordinary "tin-floated" window glass.

Applied to the rear surface of beam 10 is resistive strip 18 (see FIG. 2). It has been found preferable to utilize a continuous resistive strip in order to avoid the irregularities inherent in prior art potentiometers, such as the wire wound variety. A tin oxide or indium oxide coating is particularly advantageous as a result of their hardness and transparency. In the preferred embodiment, tin oxide is utilized as the resistive strip since the tin oxide is harder, more durable and more resistant to the effects of chemicals, moisture, fingerprints and dirt than the indium oxide. However, as a result of its extreme chemical stability, tin oxide is very difficult to etch or chemically form as compared to the indium oxide. The most favorable method of applying the resistive strip to the glass is by vapor-reaction at the surface of the glass using halide compounds in a vapor that is directed via a venturi at the glass beam which is heated to a temperature of about 50° below the softening point of the glass (450° to 465° C.). This process produces superior results over other processes (such as evaporation, sputtering or ion plating) in many ways. The resistive strip becomes intrinsically bonded to the surface of the glass and cannot be peeled or separated from the glass. With this procedure, the resistive material also tends to penetrate into small cracks, fissures and other imperfections in the glass substrate. The extreme temperatures used in the vapor-reaction process also assure an absolutely clean surface upon which the resistor coating is applied (the chamber atmosphere is preferably 5 to 20% oxidizing). Vapor-reaction process coatings are stable thermally, chemically, and mechanically. The surfaces resulting therefrom are microsmooth, textureless, free of grain, and very hard. This particular process also seems to eliminate sudden changes in resistance along the strip. The hardness of the coating approaches the hardness of cyrstalline sapphire.

Attached to the lower surface of beam 10 is low resistance conductive bus 19. In the preferred embodiment, bus 19 is brass.

Pivot block 12 serves at least three functions. By surrounding one end of glass beam 10, it reduces the possibility of chipping or breakage of beam 10.

Furthermore, terminal strip 20 of pivot block 12 electrically contacts resistive strip 18. In addition, pivot block 12 includes two reference points 22 and 24 oriented orthogonally (see FIG. 3). Both of these reference points are metal points in the preferred embodiment. The purpose of having two such points on pivot block 12 will be discussed below.

Swing knob 14, rigidly attached to beam 10, protects the opposite end of beam 10 from chipping or breakage. Holding means 26 eases utilization of the device.

Carriage block 16 is slidably attached to beam 10. Attached to carriage block 16 are reference points 28 and 30 orthogonally oriented. In the preferred embodiment, reference point 28 is a pencil or pen point, while reference point 30 is a metal point. As is evident from FIGS. 1 and 3, points 22 and 28 are one corresponding pair of reference points, and points 24 and 30, are a second pair of corresponding reference points oriented orthogonally from the first pair. This arrangement enables rapid change between two distinct functions which are generally required of a caliper, i.e., comparison of dimensions and scribing an arch or circle.

When it is necessary to scribe an arch or circle, the device is held so that reference points 22 and 28 are in a vertical orientation. Point 28 is then rotated about point 22. To compare a dimension, the device is rotated 90° so that points 24 and 30 are vertically oriented.

In order to control the movement of carriage block 16 along beam 10, a displacement knob including knurled knob 32 is provided. As illustrated in FIGS. 2 and 4, attached to knurled knob 32 is rubber roller 34 which frictionally engages beam 10. Rotation of knurled knob 32 causes rotation of rubber roller 34, thereby moving carriage block 16 along beam 10.

Since the resistance per unit distance of resistive strip 18 is constant, the distance between the reference points on carriage block 16 and pivot block 12 is related to the resistance of resistive strip 18 between these blocks. A contact is provided on carriage block 16 in order to electrically contact the resistive strip.

As illustrated in FIGS. 2 and 4, cantilever leaf spring 36 has one end attached to carriage block 16. Sphere retainer 38 is attached to the opposite end of spring 36. Contact sphere 40 is rotatably attached to retainer 38. Spring 36 and retainer 38 cooperate to maintain contact sphere 40 against resistive 18.

Leaf springs 42 (see FIG. 1) and 44 (see FIG. 3) bias carriage block 16 with respect to beam 10. Furthermore, leaf spring 42 is electrically connected to cantilever spring 36 and also electrically contacts conductive bus 19. Thus, the resistance of the resistive strip 18 between pivot block 12 and carriage block 16 may be determined by the resistance between terminal 20 and conductive bus 19.

Ideally, a constant pressure is exerted by contact sphere 40 against resistive strip 18. Cantilever spring 36 has high performance characteristics when cost, maintenance, adjustment and wear are considered. However, any other contact structure may also be utilized. Contact sphere 40 is retained in the cavity in sphere retainer 38 having a shape that conforms to the shape of sphere 40. Contact sphere 40 may be made of ferrous alloys (various forms of steel). A stainless steel produces best results in that it resists rust and corrosion. A contact sphere 40 with a diameter in the range of 0.01 to 0.04 inches offers design advantages of compactness, accuracy, performance and low cost without undue difficulty in handling and without undue cost or tooling problems. Sphere retainer 38 is preferably bronze or brass, or mixtures of either of these alloys with graphite or molybdenum sulphide. Ordinary brass is superior, considering its low cost, easy fabrication and availability, but theoretically, the above-mentioned mixtures should have a lower friction coefficient and should last longer. The gases of the atmosphere provide considerable oils, vapors and aid in lubrication. Tests have demonstrated that the friction coefficient of the ball contact assembly increases by a factor of 10 to 20 in a vacuum.

The effective contact between spherical contact 40 and resistive strip 18 is a point. This point tends to penetrate foreign matter such as oil films, dirt and other material on the surface so that excellent electrical contact is made. This penetration also raises the effective coefficient of friction between spherical contact 40 and resistive strip 18 so that a true rolling action is obtained. The relatively large area of contact between sphere 40 and retainer 38 does not impede this rolling action.

FIG. 5 illustrates the circuitry necessary to convert the resistance between terminal strip 20 and conductive bus 19 to a numerical representation of the distance between reference points. Central to this conversion is analog to digital converter 46. Any analog to digital converter may be utilized, but the preferred embodiment employs the ICL 7106 manufactured by Intersil. Converter 46 produces a digital output signal related to the ratio of the voltage across input terminals 48 and reference terminals 50. In practice, terminal strip 20 is connected to one of the input terminals 48 and conductive bus 19 is connected to the other input terminal.

In operation, current flows from a positive voltage source through resistor 54, resistive strip 18, spherical contact 40, sphere retainer 38, cantilever spring 36, leaf spring 42, conductive bus 19, any one of scaling resistors 52 to ground within converter 46. Since resistor 54 is on the order of 100,000 ohms, and the resistive strip and resistors 52 may vary between 0 and 5,000 ohms, the total resistance of this series resistive remains relatively constant, independent of the sensitive strip or scaling resistance, so that the current through this circuit remains relatively constant. Therefore, the voltage across input terminals 48 and reference terminals 50 is directly related to the resistance elements thereacross. Therefore, in effect, the digital output of converter 46 is proportional to the ratio of the resistance of resistive strip 18 between terminal 20 and contact sphere 40 and the resistance of the particular resistor 52 in the circuit.

Switch 56 selects the particular scaling resistor 52, and the position of the decimal point in the display by means of programmed decimal select terminals 58. By selecting the values of resistors 52 and the position of the decimal point, the distance between the reference points on carriage block 16 and pivot block 12 may be in any particular unit or scaled to any factor. By adjusting the resistance of strip 18 to a fixed and known resistance per unit distance selection of resistors 52 is relatively easy. For example, if the resistance of strip 18 is 100 ohms per inch, a resistor 52 of 100 ohms will produce an output in inches. A resistor 52 of 100 ohms divided by 2.54 will produce a display in centimeters. A resistor 52 of 1,600 ohms, the distance will be displayed in inches and scaled by a factor of 1 to 16. Decimal scaling or changing between metric units merely involves a movement of the decimal point.

Oscillator terminals 60 permit the selection of an RC constant for a clock internal to converter 46. Furthermore, the output of oscillator 60 is utilized to drive display 62. In the preferred embodiment, display 62 is a liquid crystal display (LCD). The ICL 7106 converter produces an output capable of driving an LCD display. The output of oscillator 60 is applied through capacitor 64 to switch 56 in order to select the decimal point as indicated above. Capacitor 64 removes any possible DC or steady-state component in the drive current in order to prevent the LCD display from deteriorating due to chemical breakdown. An LCD display is utilized in the preferred embodiment because of its very low power consumption, readability at high light levels, and extremely low space and weight factor. Alternatively, display 62 may be an LED, plasma diacharge or CRT display.

In the preferred embodiment, as illustrated in FIG. 1, display 62 is embedded within the glass of rheostat beam 10. Also embedded in the glass of beam 10 are scaling indicators 66 and unit indicators 68. Indicators 66 and 68 may be connected to the circuitry by any means well-known in the art, for example, they may be LED displays connected in series with resistors 52. The remaining circuitry, i.e., as illustrated in FIG. 5, is also mounted on the device, either in terminal block 14, pivot block 12, carriage block 16 or also within the glass of beam 10.

Plug 70 is provided having points electrically connected to the resistive strip and the conductive bus so that the circuitry in FIG. 5 may be located external from the device. Alternatively, the resistance between resistive strip 18 and conductive bus 19 may be applied to the input of an analog computer, a milling machine, a plotter, or the like.

In the preferred embodiment, all resistors in the device, especially scanning resistors 52, are strips applied in the same manner as resistive strip 18 to the surface of glass beam 10. This enables thermal stability, a critical factor for high performance, in that temperature will affect resistive strip 18 and resistors 52 equally.

With display 62 mounted within the glass of beam 10, the surface of carriage block 16 over display 62 is made of clear plastic. In fact, the entire carriage block 16 may be made of plastic.

After resistive strip 18 is applied to glass beam 10, its resistance must be adjusted. The resistance per unit length, i.e., the incremental resistance, must be made constant along the strip to ensure a high degree of accuracy. One method of varying the incremental resistance is to vary the width of resistive strip 18. By narrowing strip 18, the incremental resistance at the narrow point increases. Probes spaced by a fixed distance may be utilized to determine the incremental resistance along the strip. Diamond lapping techniques, well known in the art, may be utilized to narrow the strip at the appropriate points.

In the preferred embodiment, a computer controlled trimming process is utilized. The trimming process begins with a "survey" step. Beam 10 is mounted on the equivalent of a milling machine bed so that two contacts similar to spherical contact 40 may be systematically moved along the strip. The two contacts are positioned close to each other, at a fixed distance, so that the imaginary line connecting the contacts is parallel to the length of strip 18. These contacts may thus be utilized to determine the incremental resistance of strip 18. Thus, when the numerous incremental resistance measurements and the locations of those measurements along the strip are tabulated and stored, the necessary information is at hand to make another transit during which the incremental resistance of the strip is corrected. During the second transit, the width of the strip is changed (material is removed) in accordance with the pattern of incremental resistance measurements. The diamond lapping techniques, well known in the art, may be utilized to vary the width.

In this manner, by varying the width, portions of strip 18 that had the lowest resistance are made narrower. Thus the incremental resistance of the strip is made uniform. Alternatively, any other method may be utilized to make uniform the resistance per unit distance of strip 18.

In order to utilize the device, it must be zeroed. Even when carriage block 16 is as close to pivot block 12 as possible, the reference points 22 and 28, or 24 and 30, are not at the same point. It is necessary to adjust the device so that the true distance between the reference points are indicated by the display. This is accomplished by sliding terminal strip 20 (by means not shown) beneath pivot block 12 until the proper distance between the reference points is displayed.

After the resistance of the strip is made uniform, and the device is zeroed, the device is ready for use. The device is utilized in a manner similar to any caliper, except that the display instantaneously indicates the distance between the reference points, thus eliminating the necessity of utilizing a scale to either set the distance between the reference points for making a distance, or measuring the distance between the points for measuring a distance. Two sets of reference points, one set having one metal point and one pencil or pen for making distances, arcs or circles, and the other set having two metal points for measuring or marking distances, ease the utilization of this device.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention as defined in the following claims.

What is claimed is:

1. A distance measuring device comprising:
   a glass beam;
   fixed reference means rigidly attached to said beam for providing a first reference point;
   variable reference means slidably attached to said beam for providing a second reference point;

means for producing a signal related to the distance between said first and second reference points; and means for multiplying said signal so that said multiplied signal represents the distance between said first and second reference points multiplied by a scaling factor.

2. A device as in claim 1, wherein said device further comprises means for altering said signal so that said displaying means displays said distance in any one of a pluraliy of absolute units.

3. A device as in claim 2 wherein said means for altering is mounted on said device.

4. A device as in claim 1 wherein said means for multiplying is mounted on said device.

5. A device as in claim 1, wherein said means for producing and means for multiplying comprise a plurality of resistive means comprising a plurality of resistive strips rigidly attached to said beam.

6. A device as in claim 1, wherein:
said device further comprises a resistive strip rigidly attached to said beam;
said variable reference means comprises means for electrically contacting said resistive strip; and
said means for producing comprises means for measuring the resistance between a point on said resistive strip adjacent to said fixed reference means and said contacting means, said signal being related thereto.

7. A device as in claim 6 wherein:
said device further comprises a low-resistance conductive bus rigidly attached to said beam; and
said means for measuring measures the resistance between a point on said resistive strip adjacent to said fixed reference means and said bus.

8. A device as in claim 7 wherein said means for contacting comprises:
a cantilever leaf spring attached at one end to said housing;
a sphere retainer attached to the other end of said cantilever spring;
a contact sphere rotatably attached to said retainer, said cantilever spring and said retainer cooperating to maintain said sphere against said resistive strip;
bow spring means attached to said housing for slidably, continuously and electrically engaging said bus; and
means for electrically connecting said bow spring means and said cantilever spring.

9. A device as in claim 8 wherein said ball is a ferrous alloy and said sphere retainer is of the group consisting of bronze, brass, bronze and graphite, bronze and molybdenum sulfide, brass and graphite, and brass and molybdenum sulfide.

10. A device as in claim 6 wherein said resistive strip is of the group consisting of indium oxide and tin oxide.

11. A device as in claim 7, further comprising means for digitally displaying said signal in a form that represents the distance between said first and second reference points in absolute units, said display means being mounted on said device.

12. A device as in claim 11 wherein:
said beam is comprised of glass; and
said means for digitally displaying is embedded in said glass.

13. A distance measuring device comprising:
a glass beam;
fixed reference means rigidly attached to said beam for providing a first reference point;

variable reference means slidably attached to said beam for providing a second reference point;
means for producing a signal related to the distance between said first and second reference points, said producing means being mounted on said device; and
means for digitally displaying said signal in a form that represents the distance between said first and second points in absolute units, said displaying means being embedded within said glass beam.

14. A device as in claim 3 or 13, wherein said means for producing and means for altering comprise a plurality of resistive means comprising a plurality of resistive strips rigidly attached to said beam.

15. A device as in claim 13, further comprising means for multiplying said signal so that said multiplied signal represents the distance between said first and second reference points multiplied by a scaling factor.

16. A distance measuring device comprising:
a beam;
fixed reference means rigidly attached to said beam for providing a first reference point;
a resistive strip rigidly attached to said beam;
variable reference means, slidably attached to said beam for providing a second reference point, said variable reference means comprising a housing slidably attached to said beam and contacting means attached to said housing for electrically contacting said resistive strip; and
means for measuring the resistance between a point on said resistive strip adjacent to said fixed reference means and said contacting means and for producing a signal related thereto, said signal also related to the distance between said first and second reference points.

17. A device as in claim 1 or 16 wherein:
said fixed reference means is rigidly attached to a first end of said beam;
said device further comprises a swing knob rigidly attached to the second end of said beam, opposite said first end, for grasping the device and for protecting said beam; and
said variable reference beam is slidably attached to said beam between said fixed reference means and said swing knob.

18. Apparatus as in claim 1 or 16 wherein said variable reference means comprises a displacement knob for varying the position of said variable reference means with respect to said beam, said displacement knob comprising a rubber roller frictionally engaged with said beam and rotatably mounted to said variable reference means.

19. A distance measuring device comprising:
a beam;
a fixed reference means rigidly attached to said beam for providing a first reference point;
a resistive strip rigidly attached to said beam;
a low resistance conductive bus rigidly attached to said beam;
variable reference means, slidably attached to said beam for providing a second reference point and for electrically interconnecting a point on said resistive strip adjacent to said conductive bus;
said variable resistance means comprising:
a housing slidable attached to said beam,
a cantilever leaf spring attached at one end to said housing, a sphere retainer attached to the other end of said cantilever spring, a contact sphere rotatably attached to said retainer, said cantilever spring and said retainer cooperating to maintain said sphere against said resistive strip, conductive bow spring means attached to said housing for slidably, continuously, and electrically engaging said bus, and means for electrically connecting said bow spring means and said cantilever spring; and means for measuring the resistance between said point on said resistive strip adjacent to said fixed reference means and said conductive bus and producing a signal related thereto, said signal also related to the distance between said first and second reference points.

20. A distance measuring device comprising:

a beam;

fixed reference means rigidly attached to said beam for providing a first reference point;

a resistive strip rigidly attached to said beam;

variable reference means, slidably attached to said beam for providing a second reference point, said variable reference means comprising a housing slidably attached to said beam and contacting means attached to said housing for electrically contacting said resistive strip;

means for measuring the resistance between a point on said resistive strip adjacent to said fixed reference means and said contacting means and for producing a signal related thereto, said signal also related to the distance between said first and second reference points, said measuring means being mounted on said device; and means for digitally displaying said signal in a form that represents the distance between said first and second reference points in absolute units, said display means being mounted on said device.

21. A device as in claim 16 or 20 wherein said beam is a bar of solid glass.

22. A distance measuring device comprising:

a beam;

fixed reference means rigidly attached to said beam for providing a first reference point;

a resistive strip rigidly attached to said beam;

a low resistance conductive bus rigidly attached to said beam;

variable reference means, slidably attached to said beam for providing a second reference point and for electrically interconnecting a point on said resistive strip and said conductive bus;

said variable resistance means comprising:

a housing slidable attached to said beam, a cantilever leaf spring attached at one end to said housing, a sphere retainer attached to the other end of said cantilever spring, a contact sphere rotatably attached to said retainer, said cantilever spring and said retainer cooperating to maintain said sphere electrically connected to said resistive strip, conductive bow spring means, attached to said housing for slidably, continuously and electrically engaging said bus, and means for electrically connecting said bow spring means and said cantilever spring;

means for measuring the resistance between said point on said resistive strip adjacent to said fixed reference means and said conductive bus and producing a signal related thereto, said signal also related to the distance between said first and second reference points, said producing means being mounted on said device; and means for digitally displaying said signal in a form that represents the distance between said first and second reference points in absolute units, said display means being mounted on said device.

23. A distance measuring device comprising:

a glass beam;

fixed reference means rigidly attached to said beam, for providing a first reference point;

a resistive strip rigidly attached to said beam;

a low resistance conductive bus rigidly attached to said beam;

variable reference means, slidably attached to said beam for providing a second reference point and for electrically interconnecting a point on said resistive strip to said conductive bus;

said variable reference means comprising:

a housing slidably attached to said beam, a cantilever leaf spring attached at one end to said housing, a sphere retainer attached at the other end of said cantilever spring, a contact sphere rotatably attached to said retainer, said cantilever spring and said retainer cooperating to maintain said sphere against said resistive strip, conductive bow spring means attached to said housing for slidably, continuously and electrically engaging said bus, and means for electrically connecting said bow spring means and said cantilever spring;

means for measuring the resistance between a point on said resistive strip adjacent to said fixed reference means and said conductive bus and producing a signal related thereto;

means for digitally displaying said signal in a form that represents the distance between said first and second reference points in absolute units, said displaying means being mounted on said device; and means for altering said signal so that said displaying means displays at least one of said distance multiplied by a scaling factor and said distance in any one of a plurality of absolute units.

24. A device as in claim 23, wherein said means for measuring and means for altering comprise a plurality of resistive means comprising a plurality of resistive strips rigidly attached to said beam.

25. A device as in claim 1, 16 or 23, wherein said device further includes a plug attached to said device for transmitting said signal.

26. A device as in claim 25 further comprising means for displaying said signal in a form that represents the distance between said first and second reference points in absolute units, said display means being detachably connected to said plug.

27. A device as in claim 1, 16 or 23, wherein said fixed reference means and variable reference means are plastic.

28. A device as in claim 16, 19, 20, 22 or 27, wherein said resistive strip is comprised of the group including indium oxide and tin oxide.

* * * * *